(12) United States Patent
Tsukagoshi et al.

(10) Patent No.: US 7,589,876 B2
(45) Date of Patent: Sep. 15, 2009

(54) HOLOGRAPHIC MEMORY REPRODUCTION METHOD AND APPARATUS

(75) Inventors: Takuya Tsukagoshi, Sagamihara (JP); Jiro Yoshinari, Tokyo (JP); Hideaki Miura, Tokyo (JP); Tetsuro Mizushima, Moriguchi (JP)

(73) Assignee: TDK Corporation, Tokyo (JP)

( * ) Notice: Subject to any disclaimer, the term of this patent is extended or adjusted under 35 U.S.C. 154(b) by 320 days.

(21) Appl. No.: 10/580,819

(22) PCT Filed: Nov. 10, 2004

(86) PCT No.: PCT/JP2004/016646

§ 371 (c)(1),
(2), (4) Date: May 26, 2006

(87) PCT Pub. No.: WO2005/052929

PCT Pub. Date: Jun. 9, 2005

(65) Prior Publication Data

US 2007/0109943 A1    May 17, 2007

(30) Foreign Application Priority Data

Nov. 28, 2003   (JP) .............................. 2003-400456

(51) Int. Cl.
*G03H 1/28* (2006.01)
*G03H 1/22* (2006.01)
*G02B 5/32* (2006.01)
*G11B 7/00* (2006.01)

(52) U.S. Cl. .............................. 359/24; 359/32; 359/15; 369/103

(58) Field of Classification Search .................... 359/24
See application file for complete search history.

(56) References Cited

U.S. PATENT DOCUMENTS

2007/0109943 A1 * 5/2007 Tsukagoshi et al. ......... 369/103

FOREIGN PATENT DOCUMENTS

| JP | A-54-085054 | 7/1979 |
| JP | A-11-016374 | 1/1999 |
| JP | A-2000-268380 | 9/2000 |
| JP | A-2003-085768 | 3/2003 |
| JP | A-2005-010599 | 1/2005 |

* cited by examiner

*Primary Examiner*—Stephone B Allen
*Assistant Examiner*—Jade R Callaway
(74) *Attorney, Agent, or Firm*—Oliff & Berridge, PLC

(57) ABSTRACT

A method and apparatus for performing reproduction position servo-control without reducing the recording capacity of a holographic recording medium. Upon the reproduction of a holographic recording medium 18, part of a reproduction beam serving as a servo beam is projected onto a recording layer 18A of the holographic recording medium 18 from the side opposite to the side of the reproduction beam (a reference beam) along the same optical axis as that of the reproduction beam, and the diffraction beam thereof is detected by a photodetector 26C through a polarizing beam splitter 26B.

33 Claims, 9 Drawing Sheets

HOLOGRAPHIC MEMORY REPRODUCTION METHOD AND APPARATUS

TECHNICAL FIELD

This invention relates to a holographic memory reproduction method and apparatus.

BACKGROUND ART

For example, in Japanese Patent Laid-Open Publication No. 2003-85768, an optical information recording apparatus and method have been disclosed in which servo control in a moving direction of an optical information recording medium is performed by detecting a positional deviation between an optical head and at least one lockup pit arranged in an information recording area, whereby an information beam and a reference beam for recording are continuously and accurately projected onto an information recording position without causing positional deviation during hologram recording to thereby record holograms in the optical information recording medium.

In this case, the lockup pit arranged in the information recording area is an area on which holographic recording cannot be performed.

As described above, in the optical information recording apparatus and method disclosed in Japanese Patent Laid-Open Publication No. 2003-85768, the lockup pit serving as the reference for the servo control is an area on which holographic recording cannot be performed. Therefore, problems arise that the data capacity of the recording medium is reduced by an amount corresponding to the area of the above-mentioned lockup pit, and that the number of manufacturing steps for forming the lockup pit increases or noise in a data beam increases.

DISCLOSURE OF THE INVENTION

This invention has been made in view of the abovementioned problems. Accordingly, it is an object of the invention to provide a holographic memory reproduction method and apparatus in which extra processing for a lockup pit or the like is not required in a servo layer without reducing the data capacity.

The present inventor has made intensive studies and has consequently found that reproduction position servo-control can be performed by projecting, onto interference fringes formed in a recording layer of a holographic recording medium, a servo beam which satisfies the Bragg condition while at least one of the wavelength, incident angle, and incident direction thereof is different from that of a reproduction beam.

In summary, the above-described objectives are achieved by the following embodiments of the present invention.

(1) A holographic memory reproduction method, wherein, when a diffraction beam is generated in a recording layer of a holographic recording medium by projecting a reproduction beam onto interference fringes formed by projecting an object beam and a reference beam onto the recording layer to thereby reproduce information from this diffraction beam, a servo beam which satisfies the Bragg condition while at least one of the wavelength, incident angle, and incident direction thereof is different from that of the reproduction beam is projected onto the interference fringes, whereby the reproduction position servo-control of the holographic recording medium is performed by means of the diffraction beam generated by the projection of the servo beam.

(2) The holographic memory reproduction method according to (1), wherein the servo beam is projected along a projection optical axis of the object beam and the direction opposite to that of the object beam.

(3) The holographic memory reproduction method according to (1), wherein the servo beam is projected along a projection optical axis of the object beam and the direction the same as that of the object beam.

(4) The holographic memory reproduction method according to (1), wherein the servo beam is projected along a projection optical axis of the reference beam and the direction the same as that of the reference beam.

(5) The holographic memory reproduction method according to (1), wherein the servo beam is projected along a projection optical axis of the reference beam and the direction opposite to that of the reference beam.

(6) The holographic memory reproduction method according to any one of (1) to (5), wherein the servo beam is a plane wave having a beam diameter of $1/100$ to $1/10$ of the beam diameter of one of the object beam, the reference beam, and the reproduction beam.

(7) The holographic memory reproduction method according to (6), wherein at least one of the object beam and the reference beam is a non-collimated beam, and the interference fringes are formed through spherical waves.

(8) The holographic memory reproduction method according to any one of (1) to (7), wherein the servo beam is projected from a beam source different from that for the reproduction beam.

(9) The holographic memory reproduction method according to any one of (1) to (7), wherein the servo beam is projected by splitting part of the reproduction beam.

(10) The holographic memory reproduction method according to any one of (1) to (9), wherein shift multiplex recording is performed two-dimensionally on the holographic recording medium, and two-dimensional reproduction position servo-control is performed on the holographic recording medium by means of the diffraction beam generated by the projection of the servo beam.

(11) A holographic memory reproduction apparatus in which a diffraction beam is generated in a recording layer of a holographic recording medium by projecting a reproduction beam onto interference fringes formed by projecting an object beam and a reference beam onto the recording layer to thereby reproduce information from this diffraction beam, the apparatus comprising a servo optical system in which a servo beam which satisfies the Bragg condition while at least one of the wavelength, incident angle, and incident direction thereof is different from that of the reproduction beam is projected onto the interference fringes, whereby the reproduction position servo-control of the holographic recording medium is performed by means of the diffraction beam generated by the projection of the servo beam.

(12) The holographic memory reproduction apparatus according to (11), wherein the servo optical system is configured such that the servo beam is projected along a projection optical axis of the object beam and the direction opposite to that of the object beam.

(13) The holographic memory reproduction apparatus according to (11), wherein the servo optical system is configured such that the servo beam is projected along a projection optical axis of the object beam and the direction the same as that of the object beam.

(14) The holographic memory reproduction apparatus according to (11), wherein the servo optical system is configured such that the servo beam is projected along a projection optical axis of the reference beam and the direction the same as that of the reference beam.

(15) The holographic memory reproduction apparatus according to (11), wherein the servo optical system is configured such that the servo beam is projected along a projection optical-axis of the reference beam and one of the direction opposite to that of the reference beam.

(16) The holographic memory reproduction apparatus according to any one of (11) to (15), wherein the servo optical system is configured such that the servo beam is a plane wave having a beam diameter of $1/100$ to $1/10$ of the beam diameter of one of the object beam, the reference beam, and the reproduction beam.

(17) The holographic memory reproduction apparatus according to any one of (11) to (16), wherein shift multiplex recording is performed two-dimensionally on the holographic recording medium, and the servo optical system is configured such that two-dimensional reproduction position servo-control is performed on the holographic recording medium by means of the diffraction beam generated by the projection of the servo beam.

(18) The holographic memory reproduction apparatus according to any one of (11) to (17), wherein the servo optical system comprises a servo beam source which emits the servo beam different from the reproduction beam.

(19) The holographic memory reproduction apparatus according to any one of (11) to (17), wherein the servo optical system comprises a reproduction beam splitting apparatus which forms the servo beams by splitting part of the reproduction beam.

BEST MODE FOR CARRYING OUT THE INVENTION

Figure 1:
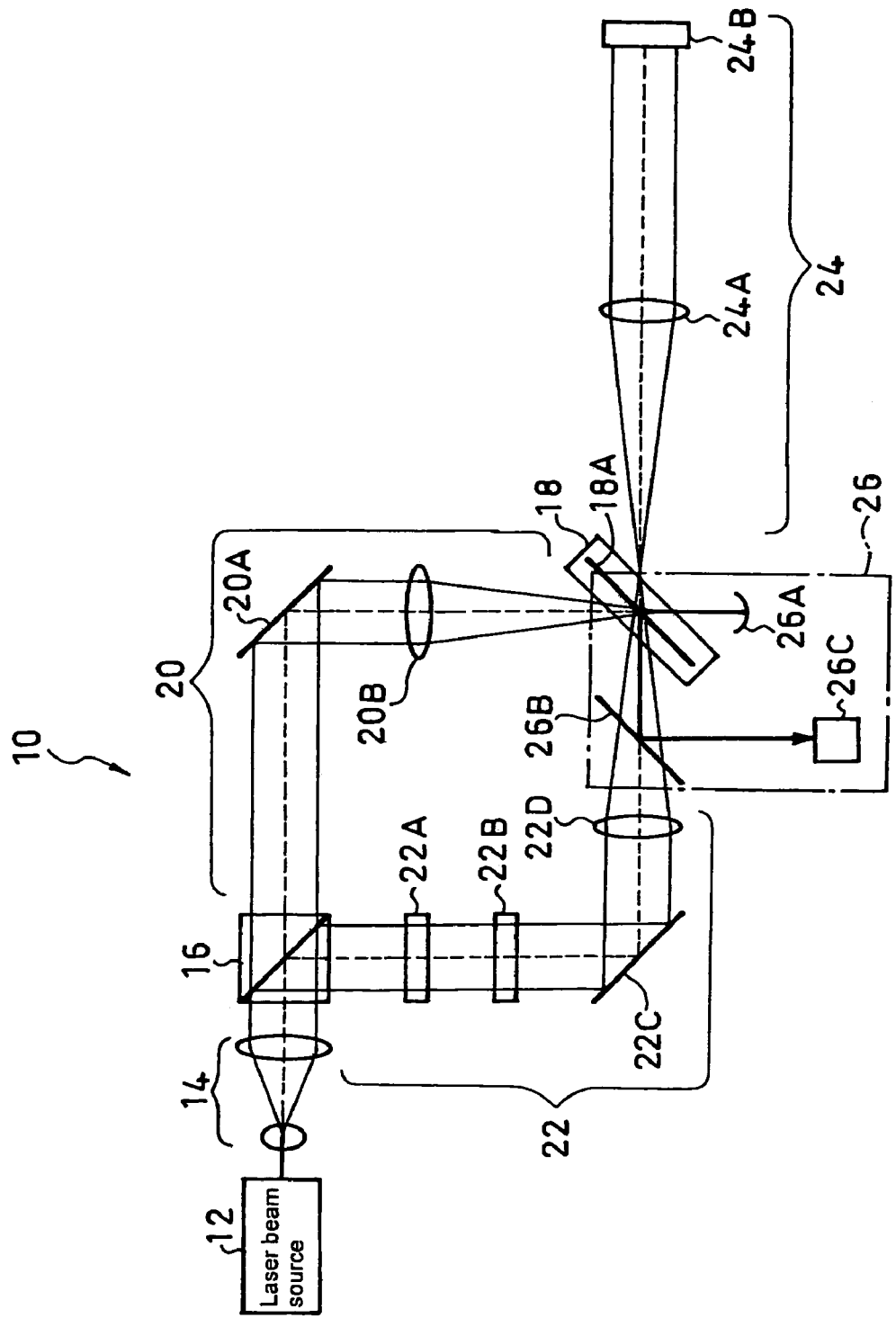
FIG. 1 is an optical system diagram illustrating a holographic recording and reproducing apparatus according to a first embodiment of the present invention.

A beam which is part of a reproduction beam projected onto a holographic recording medium and has passed through the holographic recording medium is reflected by a mirror and is then projected onto the holographic recording medium, and the diffraction beam therefrom is extracted as a servo beam. By detecting the servo beam, reproduction position servo-control is performed.

FIRST EMBODIMENT

Next, a first embodiment will be described with reference to FIGS. 1 and 2.

A holographic recording and reproducing apparatus 10 according to the first embodiment is configured to include: a laser beam source 12; a beam expander 14 for expanding the beam diameter of a laser beam emitted from the laser beam source 12; a polarizing beam splitter 16 which splits the laser beam having the beam diameter expanded by this beam expander 14 into a p-polarized beam and an s-polarized beam; a reference optical system 20 which guides the p-polarized beam having passed through this polarizing beam splitter 16 to a holographic recording medium 18 as a reference beam; an object optical system 22 which guides the s-polarized beam having been reflected by the polarizing beam splitter 16 to the abovementioned holographic recording medium 18 as an object beam; an imaging optical system 24 which is provided on the optical axis of the object beam projected onto the holographic recording medium 18 via this object optical system 22 and is arranged on the side opposite to the holographic recording medium 18; and a servo optical system 26 which projects the servo beam onto the abovementioned holographic recording medium 18 and receives the diffraction beam thereof to perform reproduction position servo-control.

The abovementioned reference optical system 20 is configured to include a mirror 20A and an objective lens 20B in this order from the side of the polarizing beam splitter 16.

Moreover, the object optical system 22 is configured to include a ½ wave plate 22A, a spatial light modulator 22B, a mirror 22C, and a Fourier lens 22D in this order from the side of the polarizing beam splitter 16.

The imaging optical system 24 is configured to include an imaging lens 24A and an imaging device 24B on which an image of the diffraction beam from the abovementioned holographic recording medium 18 is formed via this imaging lens 24A, in this order from the side of the holographic recording medium 18.

Moreover, the servo optical system 26 is configured to include: a concave mirror 26A provided on a line extending the optical axis of the reference beam from the reference optical system 20 and passing through the holographic recording medium 18; a polarizing beam splitter 26B provided on the optical axis of the object beam between the Fourier lens 22D in the abovementioned object optical system 22 and the holographic recording medium 18; and a photodetector 26C provided on the optical axis of a reflection beam which is reflected orthogonally from the polarizing beam splitter 26B after traveling along the optical axis of the object beam from the abovementioned holographic recording medium 18 toward the polarizing beam splitter 26B. The abovementioned polarizing beam splitter 26B is designed to reflect the s-polarized beam and to allow the p-polarized beam to pass through.

Further, the abovementioned concave mirror 26A is designed such that, when the reproduction beam is incident on the holographic recording medium 18 in a similar manner as that of the reference beam, the transmission beam thereof is reflected in the opposite direction along the optical axis of the reproduction beam, and such that, at this time, the beam diameter of the reflection beam becomes 1/100 to 1/10 of the beam diameter of the reference beam (this may be the object beam or the reproduction beam) expanded by the abovementioned beam expander 14.

First, a description will be given of a process of recording information in the holographic recording medium 18 by means of the abovementioned holographic recording and reproducing apparatus 10.

The beam diameter of the laser beam from the laser beam source 12 is expanded by the beam expander 14. This laser beam is split into a p-polarized beam which is a transmission beam and an s-polarized beam which is a reflection beam by the polarizing beam splitter 16. The p-polarized beam and the s-polarized beam enter the reference optical system 20 and the object optical system 22, respectively.

In the reference optical system 20, the reference beam is reflected by the mirror 20A, is converted to a spherical wave through the objective lens 20B, and is then projected onto the holographic recording medium 18.

On the other hand, in the object optical system 22, the phase of the s-polarized beam serving as the object beam is shifted by the ½ wave plate 22A to form a p-polarized beam, and the data to be recorded is provided to this beam at the spatial light modulator 22B. The beam is then reflected by the mirror 22C, is converted to a spherical wave through the Fourier lens 22D, and is projected onto the holographic recording medium 18.

Both the reference and object beams projected onto the holographic recording medium 18 are a p-polarized beam and pass through the same area in a recording layer 18A to thereby form optical interference fringes. Hence, the abovementioned provided data is recorded in the holographic recording medium 18.

When the information (data) in the holographic recording medium 18 is reproduced, the object beam is blocked by the spatial light modulator 22B, and the reference beam is employed as the reproduction beam and is projected onto the holographic recording medium 18.

When the reproduction beam is projected onto the recording layer 18A of the holographic recording medium 18, a diffraction beam is generated by the interference fringes therein. This diffraction beam forms an image on the imaging device 24B through the imaging lens 24A, and the abovementioned data is reproduced based on the information obtained by the imaging device 24B.

Most of the abovementioned reproduction beam is not diffracted by the holographic recording medium 18 and is incident on the concave mirror 26A of the abovementioned servo optical system 26 as a transmission beam. The abovementioned reproduction beam passes through the holographic recording medium 18. After passing through a focal point, the reproduction beam is projected onto the concave mirror 26A as a diverging spherical wave and is reflected in the opposite direction toward the holographic recording medium 18 as a collimated plane wave.

At this time, the beam diameter of the reflected beam is reduced, and this beam is projected onto the holographic recording medium 18 from the direction opposite the reproduction beam. In the holographic recording medium 18, a servo beam is generated which is a diffraction beam in the direction opposite the abovementioned object beam.

This servo beam is reflected by the abovementioned polarizing beam splitter 26B and is incident on the photodetector 26C.

Here, since the polarizing beam splitter 26B of the abovementioned servo optical system 26 is designed to allow a p-polarized beam to pass through, the object beam is not reflected by this polarizing beam splitter 26B.

Figure 3:
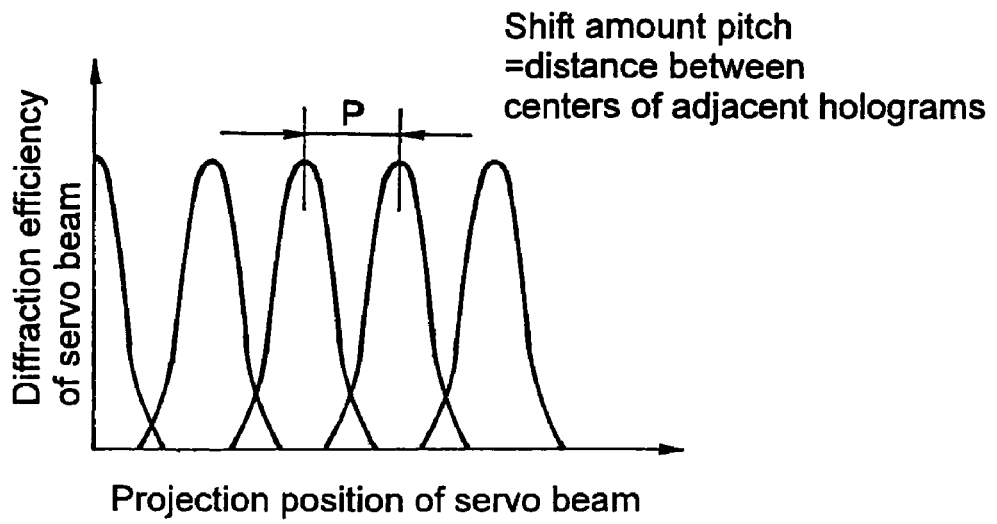
FIG. 3 is a diagram showing the relationship between the projection position of a servo beam and the diffraction efficiency of the servo beam in the first embodiment.

The diffraction efficiency of the beam reflected by the abovementioned concave mirror 26A (the servo beam) largely varies in the abovementioned recording layer 18A depending on the projection position of the servo beam as shown in FIG. 3. The pitch of the peaks of the diffraction efficiency is the same as the shift amount pitch P (the distance between the centers of the adjacent holograms) of the interference fringes which are shift-multiplex-recorded.

Figure 4:
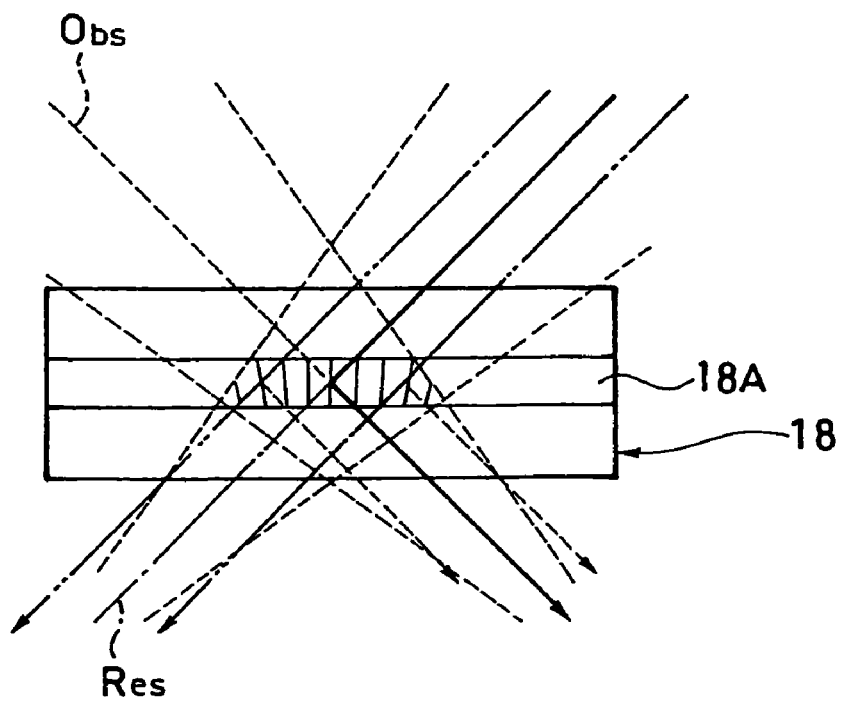
FIG. 4 is a diagram illustrating the relationship among the projection position of the servo beam, interference fringes, and a diffraction beam in the first embodiment.

This is because, if the interference fringes are formed through spherical waves as shown in FIG. 4, the diffraction beam is generated only at the moment at which the optical axis of the servo beam is coincident with a reference beam axis Res (i.e., the Bragg condition is satisfied), as shown by a solid line in FIG. 4, during the lateral translational motion (the relative motion) of the holographic recording medium 18 with respect to the servo beam having a small beam diameter. As shown by a long dashed short dashed line and a long dashed double-short dashed line, if the optical axis of the servo beam deviates from that of the reference beam, the diffraction beam is not generated since the incident angle of the servo beam is different from that of the reference beam for the interference fringes in the region through which the servo beam passes (i.e., the Bragg condition is not satisfied).

Therefore, by detecting the diffraction beam generated only at the moment at which the optical axis of the servo beam is coincident with the reference beam axis as mentioned above by means of the photodetector 26C, a reproduction position can be servo-controlled to the position at which the output signal thereof has a peak value.

Figure 5:
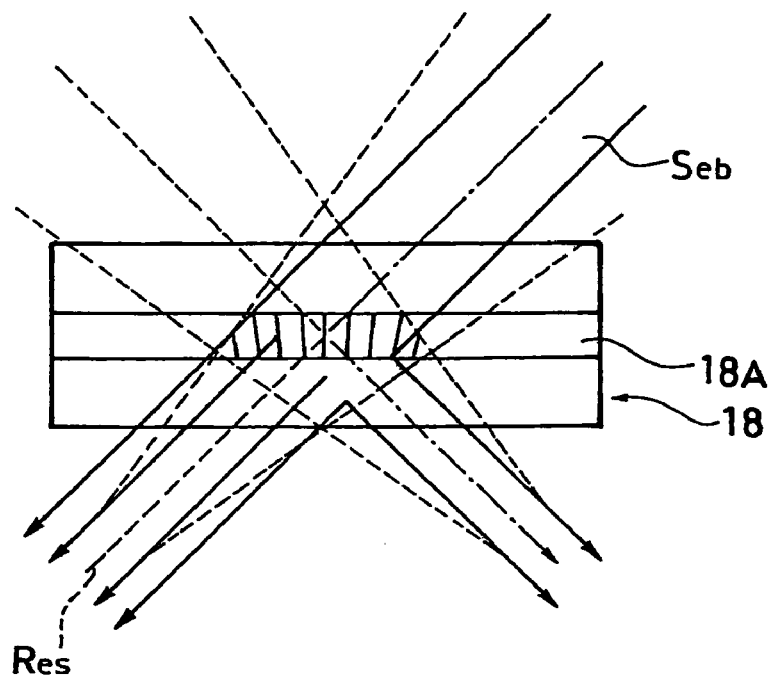
FIG. 5 is a diagram illustrating the relationship between a large diameter servo beam and a diffraction beam.

On the contrary to the above, for example, in the case where a servo beam Seb having a beam diameter larger than the sift selectivity of the holograms is projected as shown in FIG. 5, only a partial light beam around the optical axis of the servo beam is diffracted even when the optical axis of the servo beam Seb is coincident with the reference beam axis Res, and part of the servo beam away from the optical axis (by the shift selectivity or larger) passes through.

Hence, the peak value of the diffraction efficiency is smaller than that of the servo beam having a small beam diameter. Further, even when the optical axis of the servo beam deviates slightly from that of the reference beam, a permissible width with respect to the positional deviation of the servo beam (from the reference beam) becomes larger since a partial light beam around the portion coincident with the reference beam axis is diffracted.

Figure 6:
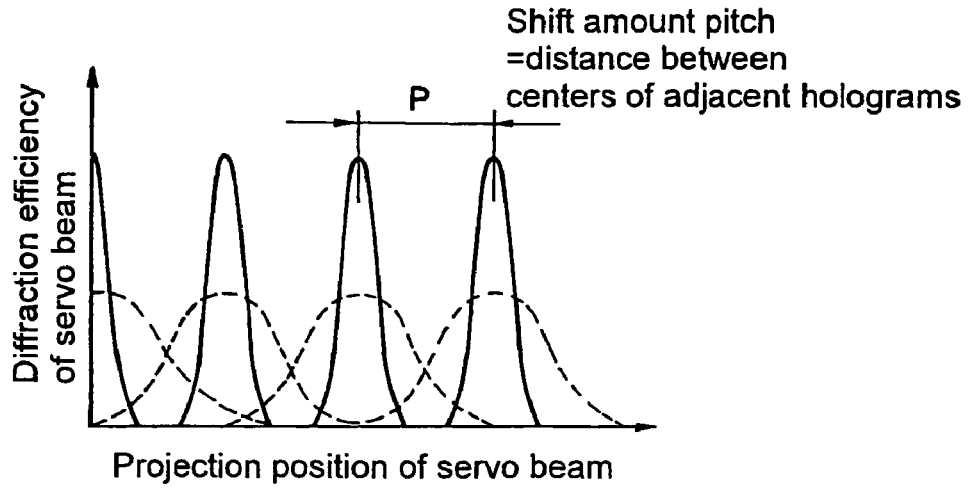
FIG. 6 is a diagram showing the relationship among the beam diameter of the servo beam, the projection position of the servo beam, and the diffraction efficiency of the servo beam.

FIG. 6 is a diagram illustrating this case. In FIG. 6, a solid line represents the case where the beam diameter of the servo beam is small, and a dashed line represents the case where the beam diameter of the servo beam is large.

As can be seen from FIG. 6, if the beam diameter of the servo beam is increased, the separation and detection of holographic recording is difficult. On the contrary, if the beam diameter is too small, the optical system therefor becomes complicated. Thus, it is preferable that the optimum value of the beam diameter of the servo beam be $1/100$ to $1/10$ of the beam diameter of the reproduction beam.

SECOND EMBODIMENT

In the first embodiment above, the transmission beam of the reproduction beam serves as the servo beam, and the reproduction beam and the servo beam have the same wavelength. However, if the servo beam having the same length as that of the reproduction beam is employed, the first embodiment is not restrictive. A servo beam source provided separately from the laser beam source 12 may be employed.

Figure 2:
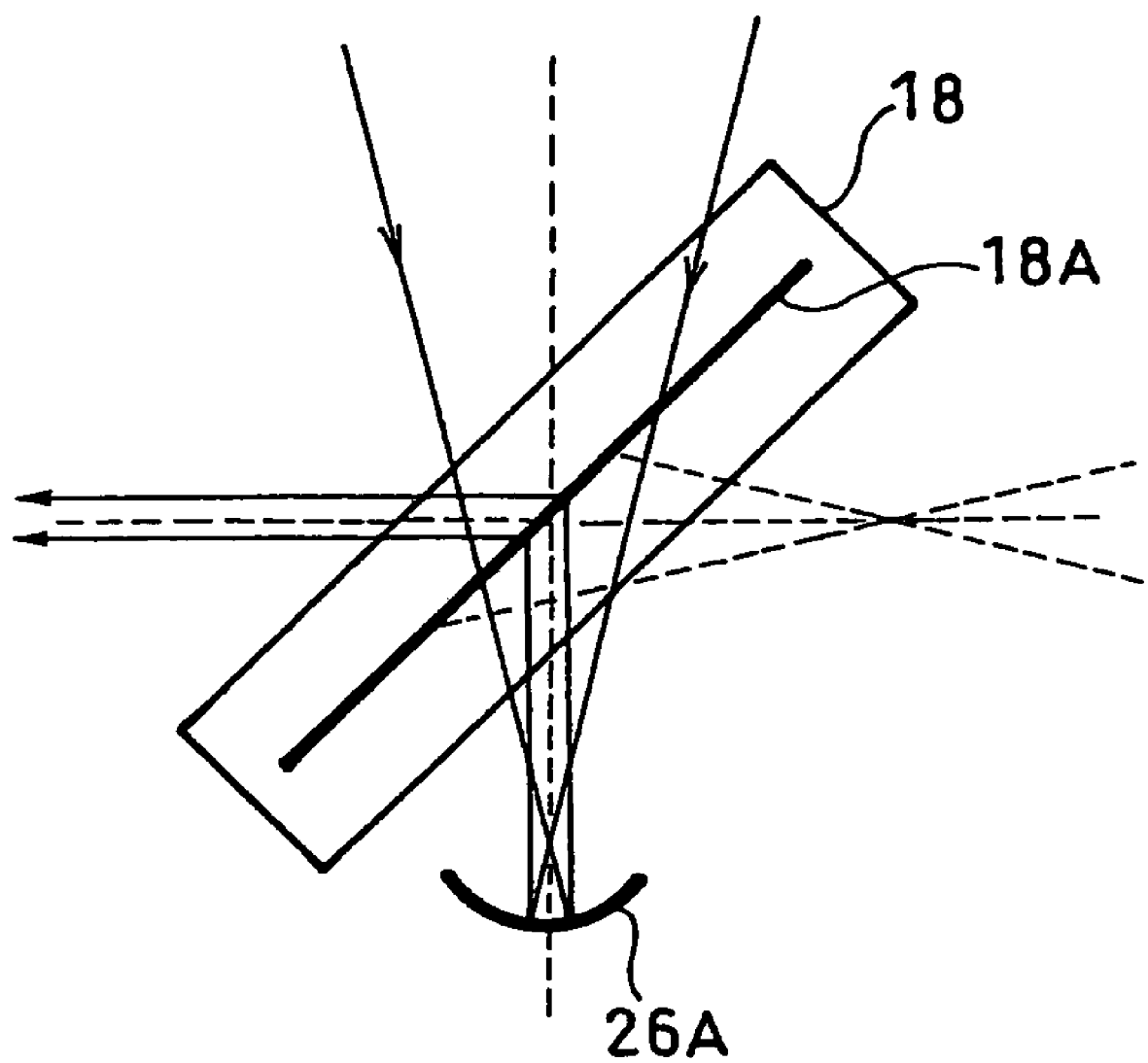
FIG. 2 is an enlarged optical system diagram illustrating a part of a servo optical system in the first embodiment.
Figure 7:
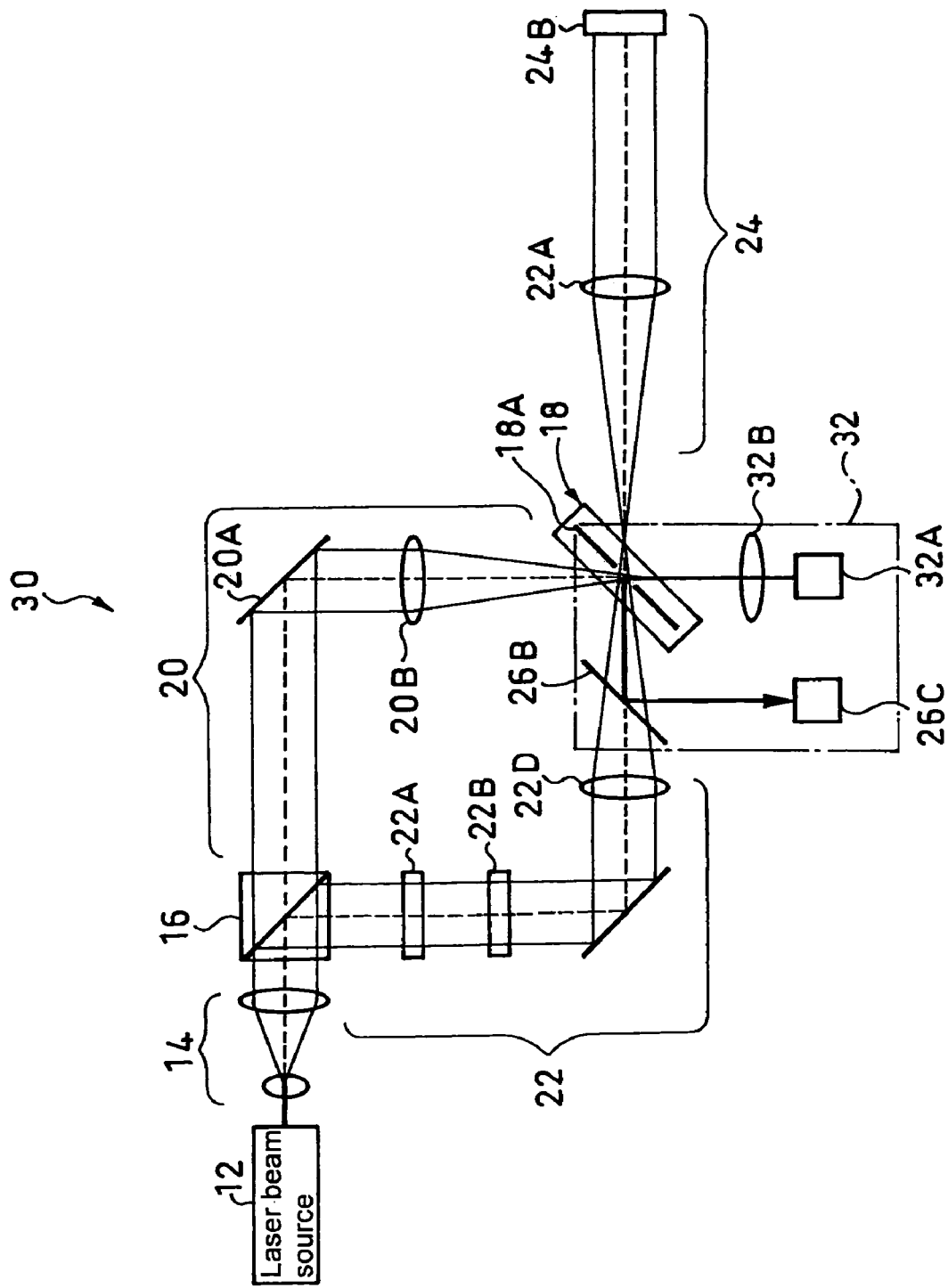
FIG. 7 is an optical system diagram illustrating a holographic recording and reproducing apparatus according to a second embodiment of the present invention.

In a holographic recording and reproducing apparatus 30 according to a second embodiment shown in FIG. 7, a servo optical system 32 is constituted by: a laser diode (a servo beam source) 32A provided on a line extending the optical axis of the reference beam in the holographic recording and reproducing apparatus 10 of FIG. 1 and passing through the holographic recording medium 18; a collimating lens 32B which shapes a laser beam from this laser diode 32A; and the polarizing beam splitter 26B and photodetector 26C the same as those provided in the servo optical system of the holographic recording and reproducing apparatus 10 of the abovementioned first embodiment.

The laser diode 32A serving as a servo beam source is designed to emit a laser beam having the same wavelength as that of the beam emitted from the laser beam source 12.

The rest of the configuration of the holographic recording and reproducing apparatus 30 is the same as that of the holographic recording and reproducing apparatus 10 of the first embodiment. Thus, the same numerals as those employed in the configuration of FIG. 1 are used, and the descriptions will be omitted.

In the second embodiment, the laser beam emitted from the laser diode 32A is shaped by the collimating lens 32B and is projected onto the holographic recording medium 18 as a servo beam. In the holographic recording medium 18, a diffraction beam serving as the servo beam is generated on the optical axis of the object beam, is reflected by the polarizing beam splitter 26B, and is received by the photodetector 26C.

In the first and second embodiments, when information is recorded in the holographic recording medium 18, the polarizing beam splitter 26B in the abovementioned servo optical systems 26 and 32 is unnecessary. Therefore, the polarizing beam splitter 26B may be evacuated from the object optical system 22 upon recording and inserted onto the optical path of the object beam upon reproduction.

In such a manner, an ordinary beam splitter may be employed in place of the polarizing beam splitter. Further, since the object optical system 22 is blocked upon reproduction, a total reflection mirror may be employed.

THIRD EMBODIMENT

In the servo optical system of the first and second embodiments, the servo beam has the same wavelength as that of the reproduction beam and is projected onto the holographic recording medium along the optical axis of the reproduction beam from the direction opposite the reproduction beam, but the present invention is not limited thereto. The servo beam may be any beam which satisfies the Bragg condition in the interference fringes while at least one of the wavelength, incident angle, and incident direction thereof is different from that of the reproduction beam.

Figure 8:
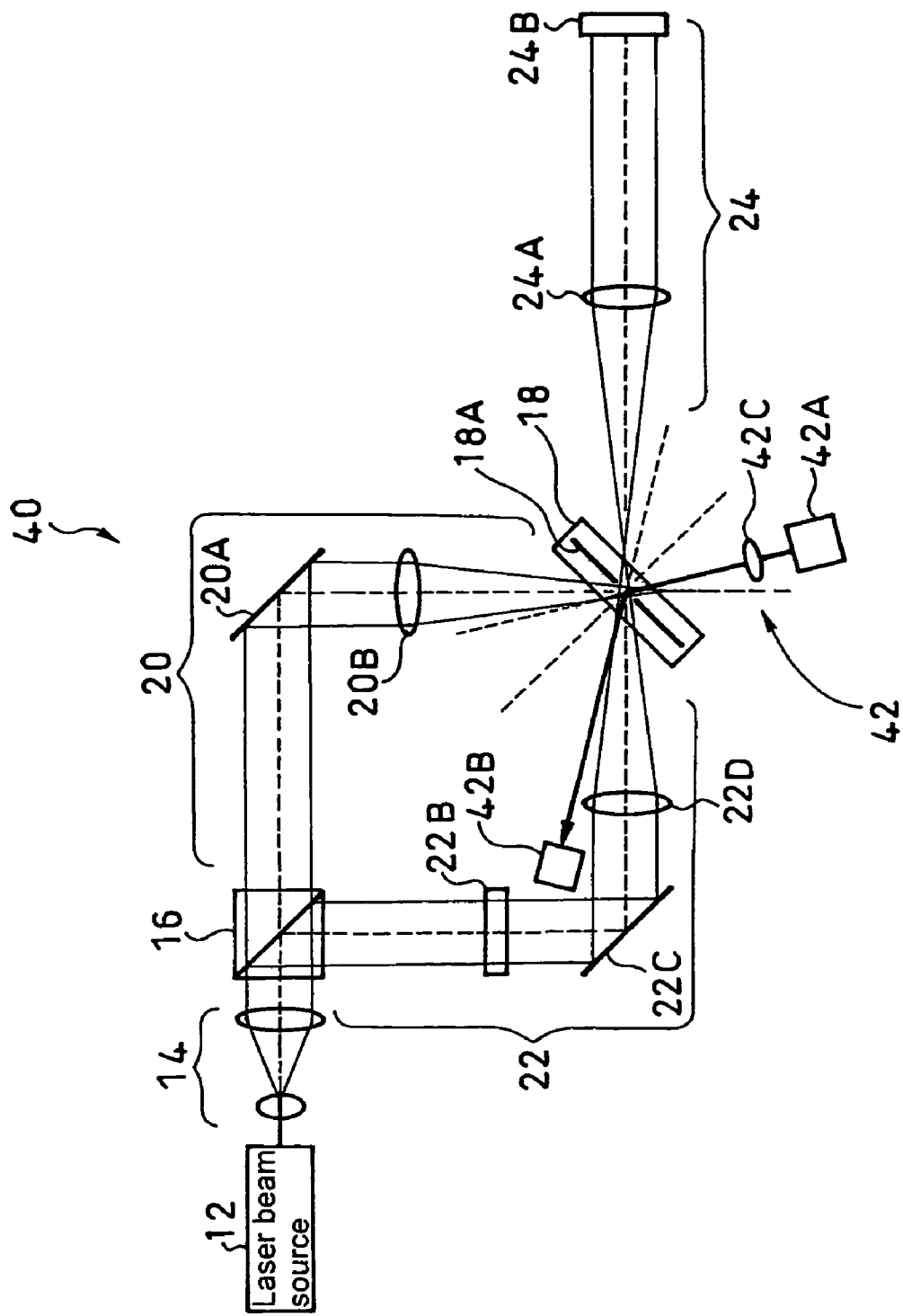
FIG. 8 is an optical system diagram illustrating a holographic recording and reproducing apparatus according to a third embodiment of the present invention.

The third embodiment shown in FIG. 8 is the case where a servo beam having a wavelength different from that of the reproduction beam is employed. In a holographic recording and reproducing apparatus 40 according to the third embodiment, a servo optical system 42 is provided which projects the servo beam from the side opposite to the side of the reproduction beam (the reference beam) and a direction different from that of the optical axis of the reproduction beam. The rest of the configuration of this holographic recording and reproducing apparatus 40 is the same as the configuration of the holographic recording and reproducing apparatus 10 of the first embodiment, except that the ½ wave plate 22A is not provided. Thus, the same numerals as those employed in the configuration of FIG. 1 are used, and the descriptions will be omitted.

The servo optical system 42 is configured to include: a servo beam source 42A which projects a servo beam having a wavelength different from that of the reproduction beam onto the holographic recording medium 18 at an incident angle different from that of the reproduction beam; a photodetector 42B which receives a diffraction beam generated by the projection; and a collimating lens 42C.

The relationship between the wavelength of the laser beam emitted from the abovementioned servo beam source 42A and the incident angle to the holographic recording medium 18 is set such that the Bragg condition is satisfied in the interference fringes in the recording layer 18A.

In the third embodiment, the servo beam is not coaxial with the reproduction beam, the reference beam, and the object beam. Therefore, it is possible to prevent the occurrence of problems including: undesirable mutual interference between coaxial beams, such as the generation of noise in a reproduction image due to multiple reflections of the servo beam from a lens or the like; and the occurrence of beam source noise and damage to a laser beam source when the servo beam enters a laser for recording and reproducing.

When the wavelength of the reproduction beam is largely different from that of the servo beam, the distribution of optimal optical components may not be compatible with an antireflection coating or the like, or some additional cost may be required for providing beam sources for different wavelengths. Thus, the wavelength difference between the reproduction beam and the servo beam may be determined by taking into account the abovementioned properties and cost.

FOURTH EMBODIMENT

Each of fourth to sixth embodiments shows the case where the servo beam is projected along the optical axis of the reference beam or the object beam from the direction the same as or opposite to that of the object beam or the reference beam.

In the fourth to sixth embodiments, the relationship among the holographic recording medium 18 and the reproduction and diffraction beams therearound is enlarged and shown, and the rest of the configuration is omitted.

Figure 9:
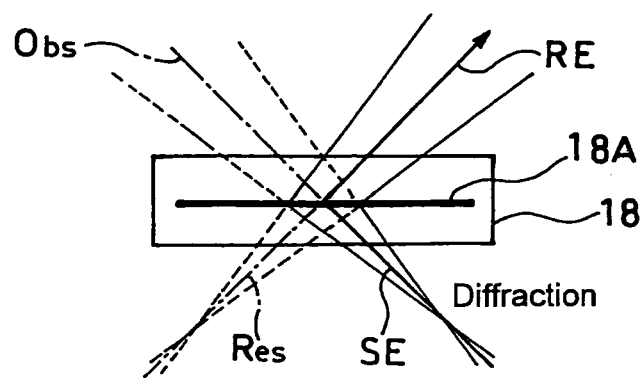
FIG. 9 is an enlarged cross-sectional view schematically illustrating the relationship among the holographic recording medium, the servo beam, and the diffraction beam in a fourth embodiment of the present invention.

In the fourth embodiment in FIG. 9, the servo beam SE is incident on the holographic recording medium 18 along the optical axis Obs of the object beam upon recording and the direction opposite the object beam, and the diffraction beam RE is obtained along the optical axis Res of the reference beam and the direction opposite the reproduction beam.

FIFTH EMBODIMENT

Figure 10:
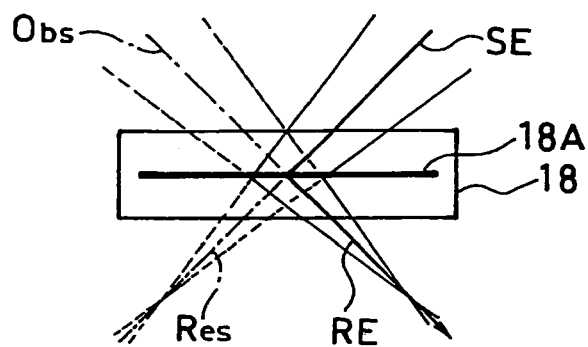
FIG. 10 is an enlarged cross-sectional view schematically illustrating the relationship among the holographic recording medium, the servo beam, and the diffraction beam in a fifth embodiment of the present invention.

In the fifth embodiment in FIG. 10, the servo beam SE is incident along the optical axis Res of the reproduction beam (the reference beam) and the direction same as that of the reproduction beam, and the diffraction beam RE thereof is obtained along a line extending the optical axis Obs of the object beam.

SIXTH EMBODIMENT

Figure 11:
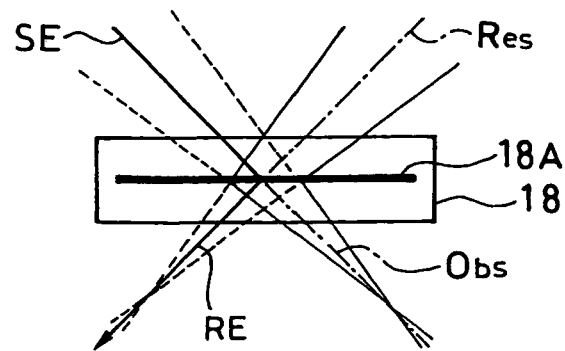
FIG. 11 is an enlarged cross-sectional view schematically illustrating the relationship among the holographic recording medium, the servo beam, and the diffraction beam in a sixth embodiment of the present invention.

In the sixth embodiment in FIG. 11, the servo beam SE is incident along the optical axis Obs of the object beam and the same direction as that of the object beam, and the diffraction beam RE is obtained along a line extending the optical axis Res of the reference beam.

SEVENTH EMBODIMENT

Figure 12:
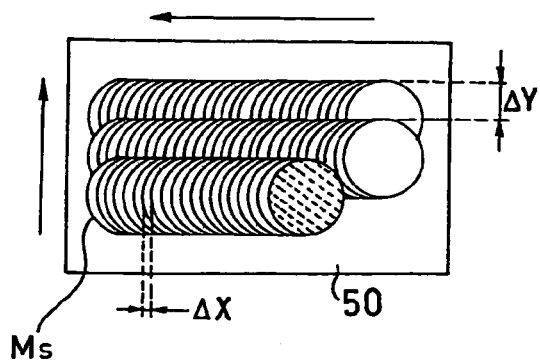
FIG. 12 is a plan view schematically illustrating a method of a seventh embodiment in which reproduction position servo-control of shift-multiplex-recorded-holograms is performed in an X-axis direction and a Y-axis direction.
Figure 13:
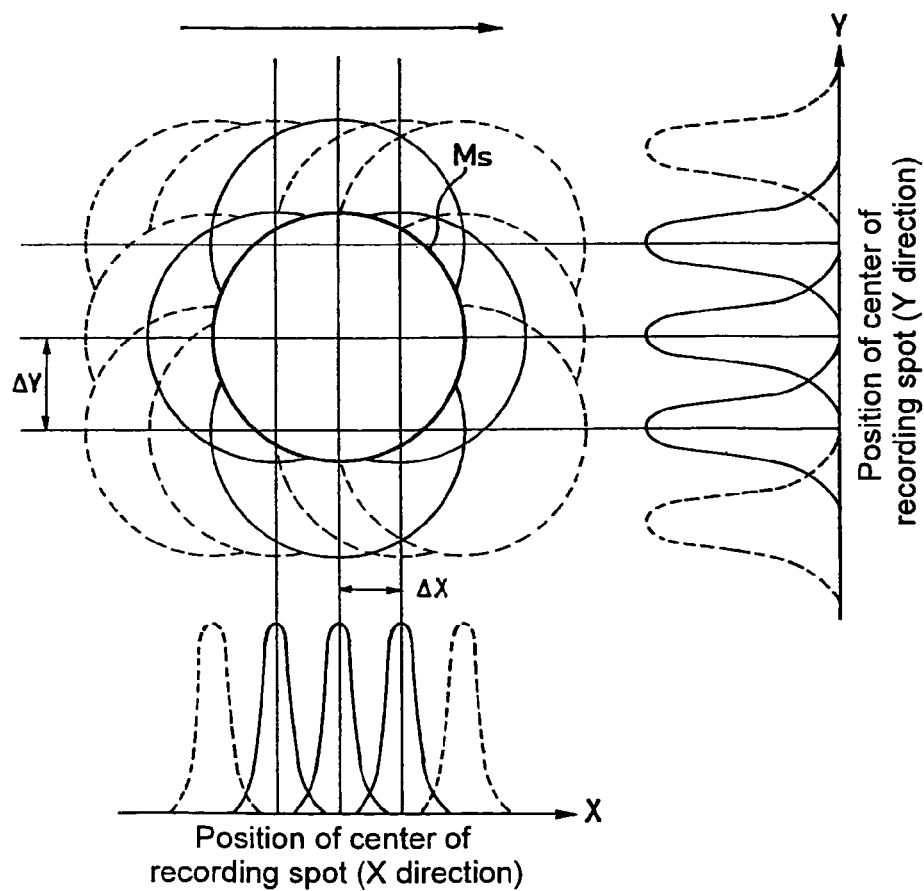
FIG. 13 is a diagram illustrating the relationship among the moving direction of the holographic recording medium, the centers of a recording spot in the X-axis direction and the Y-axis direction, and diffraction efficiency in the seventh embodiment.

Next, a description will be given of a case in which reproduction servo-control is performed in an X-axis direction and a Y-axis direction during the reproduction of a holographic recording medium 50 on which shift multiplex shift recording has been performed two-dimensionally (in the X-axis and Y-axis directions) as shown in FIG. 12.

For convenience of description, the X-axis is defined as the line of intersection of a recording surface of the holographic recording medium 50 with an incident plane of the object beam and the reference beam, and the Y-axis is defined as the direction included in the recording surface and orthogonal to the X-axis.

According to the principle of shift multiplex recording, selectivity in the Y-axis direction is lower than that in the X-axis direction. That is, assuming that the minimum pitch necessary for separating adjacent unit recording spots Ms is $\Delta X$ and $\Delta Y$, $\Delta X < \Delta Y$, as shown in FIG. 12.

The absolute value of the abovementioned pitch depends on optical systems to be employed and the thickness of a recording medium. For example, for a recording medium having a thickness of 1 mm, $\Delta X$ is 1 to 10 μm, and $\Delta Y$ is several tens to several hundreds of μm. (However, for a reflection type hologram in a polarizing collinear method in which an X-axis and a Y-axis cannot be defined (or are equivalent), the selectivity can be set such that both $\Delta X$ and $\Delta Y$ are approximately 1 to approximately 10 μm.)

Here, when the holographic recording medium 50 is translated in the X-axis direction while a servo beam which is narrow to the extent that the selectivity works (has a small beam diameter) is projected thereonto at the same incident angle as that of the optical axis of the reference beam, a diffraction beam emerges or is intensified only when this servo beam is nearly coincident with the optical axis of the reference beam upon recording. Hence, reproduction position servo-control can be performed in the X-axis direction. At the same time, since similar selectivity works for the positional deviation in the Y-axis direction, position servo-control (corresponding to a tracking action for an optical disc) in the Y-axis direction is also possible.

EIGHTH EMBODIMENT

Figure 14:
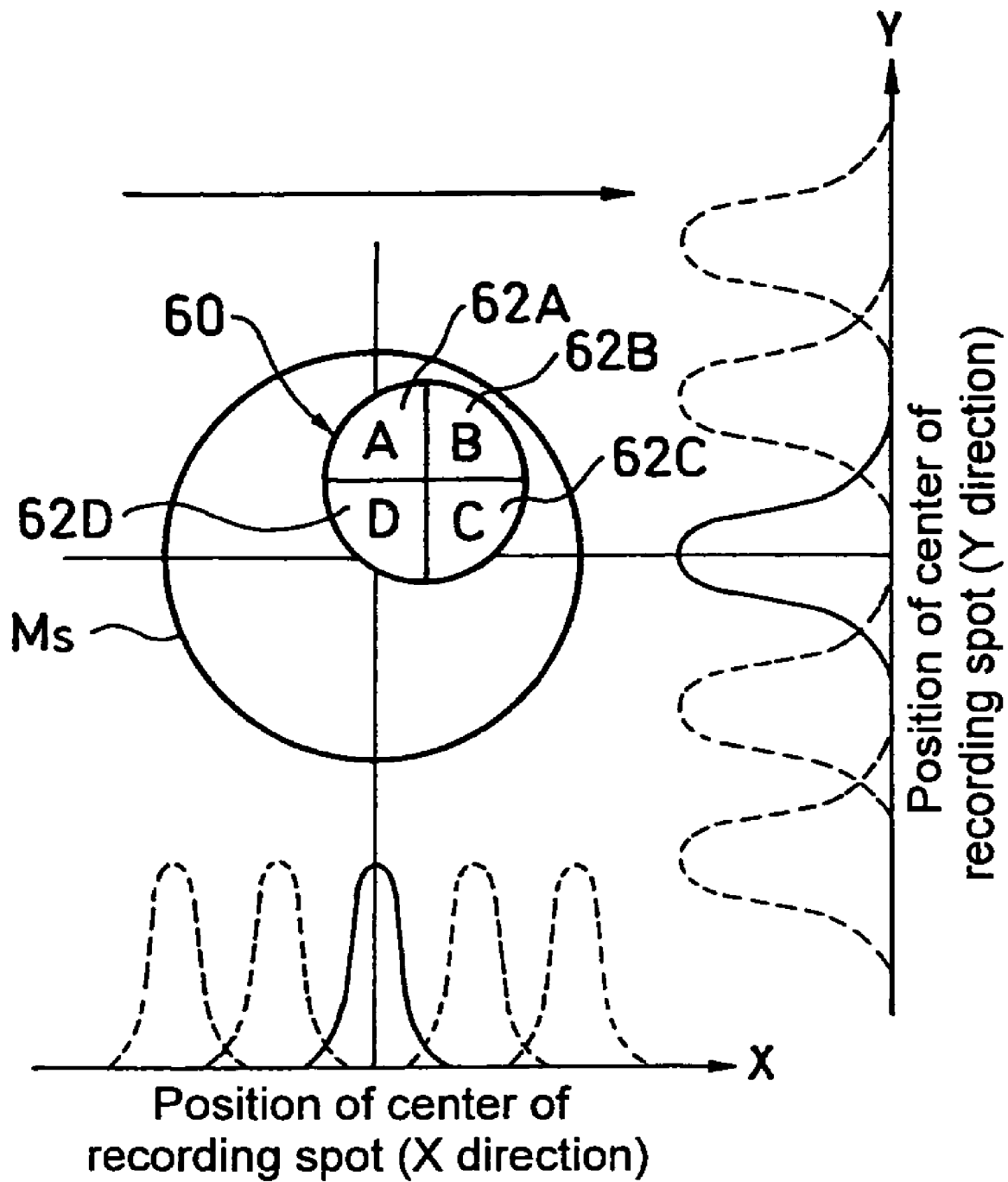
FIG. 14 is a diagram illustrating a quadrant detector employed in an eighth embodiment in which reproduction position servo control is performed in the X-axis direction and the Y-axis direction and also showing the diffraction efficiency of a diffraction beam in relationship to a recording spot.

In an apparatus for performing the reproduction position servo-control in the X-axis and Y-axis directions in the method of the seventh embodiment, for example, a quadrant detector 60 is employed as in an eight embodiment shown in FIG. 14. In this quadrant detector 60, a servo beam detection area shown in FIG. 14 is constituted by ¼ circular split detection areas 62A to 62D each of which detects the servo beam. In addition, based on the detected detection beam intensity signal, a computation is performed in a computing unit 64 to determine a reproduction point in the X- and Y-axis directions.

Here, the detected optical intensities of the abovementioned split detection areas 62A to 62D are assumed to be A to D, respectively, and the computation is performed by use of the following equations (1) to (3). For the position servo-control for the translational motion in the X-axis direction, since the center of the split detection areas 62A to 62D is coincident with the center of the recording spot Ms at the moment when (RF−sum) is maximum and (PP−X) is zero, this may be employed as the reproduction point.

$$(RF-\text{sum}) = A+B+C+D \quad (1)$$

$$(PP-X) = (B+C)-(A+D) \quad (2)$$

$$(PP-Y) = (C+D)-(A+B) \quad (3)$$

In addition, for the positional deviation in the Y-axis direction, the holographic recording medium 50 is moved downward in FIG. 14 when (PP−Y) is negative, and is moved upward when (PP−Y) is positive.

This eighth embodiment has an advantage that the direction of the deviation of the servo beam (the diffraction beam) from the center of the recording spot Ms can be found when the servo beam is not obtained.

In each of the abovementioned embodiments, a description has been given of the case where holographic recording is performed on the holographic recording medium and the apparatus for reproducing the recorded information (memory) is employed. However, the present invention is applied to a reproduction part of the holographic recording and reproducing apparatus and thus is, of course, applied to a holographic memory reproducing method and apparatus for reproduction only.

INDUSTRIAL APPLICABILITY

In this invention, the servo beam which is separable from the reproduction beam is projected onto the recording layer in which the interference fringes are formed to thereby perform the reproduction position servo-control. Therefore, since a lockup pit area or the like for the reproduction position servo-control is not required to be provided, the data capacity of the recording medium can be increased. In addition, the manufacturing process can be shortened, and noise to the reproduction beam can be reduced.

The invention claimed is:

1. A holographic memory reproduction method, wherein, when a diffraction beam is generated in a recording layer of a holographic recording medium by projecting a reproduction beam onto interference fringes formed by projecting an object beam and a reference beam onto the recording layer to thereby reproduce information from this diffraction beam, a servo beam which satisfies a Bragg condition while at least one of a wavelength, incident angle, and incident direction thereof is different from that of the reproduction beam is projected onto interference fringes, whereby a reproduction position servo-control of the holographic recording medium is performed by means of the diffraction beam generated by the projection of the servo beam.

2. The holographic memory reproduction method according to claim 1, wherein the servo beam is projected along a projection optical axis of the object beam and the direction opposite to that of the object beam.

3. The holographic memory reproduction method according to claim 1, wherein the servo beam is projected along a projection optical axis of the object beam and the direction the same as that of the object beam.

4. The holographic memory reproduction method according to claim 1, wherein the servo beam is projected along a projection optical axis of the reference beam and the direction the same as that of the reference beam.

5. The holographic memory reproduction method according to claim 1, wherein the servo beam is projected along a projection optical axis of the reference beam and the direction opposite to that of the reference beam.

6. The holographic memory reproduction method according to claim 1, wherein the servo beam is a plane wave having a beam diameter of $1/100$ to $1/10$ of the beam diameter of one of the object beam, the reference beam, and the reproduction beam.

7. The holographic memory reproduction method according to claim 6, wherein at least one of the object beam and the reference beam is a non-collimated beam, and the interference fringes are formed through spherical waves.

8. The holographic memory reproduction method according to claim 1, wherein the servo beam is projected from a beam source different from that for the reproduction beam.

9. The holographic memory reproduction method according to claim 6, wherein the servo beam is projected from a beam source different from that for the reproduction beam.

10. The holographic memory reproduction method according to claim 7, wherein the servo beam is projected from a beam source different from that for the reproduction beam.

11. The holographic memory reproduction method according to claim 1, wherein the servo beam is a reflected transmission beam of the reproduction beam reflected after transmitting the recording layer.

12. The holographic memory reproduction method according to claim 6, wherein the servo beam is a reflected transmission beam of the reproduction beam reflected after transmitting the recording layer.

13. The holographic memory reproduction method according to claim 7, wherein the servo beam is a reflected transmission beam of the reproduction beam reflected after transmitting the recording layer.

14. The holographic memory reproduction method according to claim 1, wherein shift multiplex recording is performed two-dimensionally on the holographic recording medium, and two-dimensional reproduction position servo-control is performed on the holographic recording medium by means of the diffraction beam generated by the projection of the servo beam.

15. The holographic memory reproduction method according to claim 6, wherein shift multiplex recording is performed two-dimensionally on the holographic recording medium, and two-dimensional reproduction position servo-control is performed on the holographic recording medium by means of the diffraction beam generated by the projection of the servo beam.

16. The holographic memory reproduction method according to claim 7, wherein shift multiplex recording is performed two-dimensionally on the holographic recording medium, and two-dimensional reproduction position servo-control is performed on the holographic recording medium by means of the diffraction beam generated by the projection of the servo beam.

17. The holographic memory reproduction method according to claim 8, wherein shift multiplex recording is performed two-dimensionally on the holographic recording medium, and two-dimensional reproduction position servo-control is performed on the holographic recording medium by means of the diffraction beam generated by the projection of the servo beam.

18. The holographic memory reproduction method according to claim 11, wherein shift multiplex recording is performed two-dimensionally on the holographic recording medium, and two-dimensional reproduction position servo-control is performed on the holographic recording medium by means of the diffraction beam generated by the projection of the servo beam.

19. A holographic memory reproduction apparatus in which a diffraction beam is generated in a recording layer of a holographic recording medium by projecting a reproduction beam onto interference fringes formed by projecting an object beam and a reference beam onto the recording layer to thereby reproduce information from this diffraction beam, the apparatus comprising a servo optical system in which a servo beam which satisfies a Bragg condition while at least one of a wavelength, incident angle, and incident direction thereof is different from that of the reproduction beam is projected onto interference fringes, whereby a reproduction position servo-control of the holographic recording medium is performed by means of the diffraction beam generated by the projection of the servo beam.

20. The holographic memory reproduction apparatus according to claim 19, wherein the servo optical system is configured such that the servo beam is projected along a projection optical axis of the object beam and the direction opposite to that of the object beam.

21. The holographic memory reproduction apparatus according to claim 19, wherein the servo optical system is configured such that the servo beam is projected along a projection optical axis of the object beam and the direction the same as that of the object beam.

22. The holographic memory reproduction apparatus according to claim 19, wherein the servo optical system is configured such that the servo beam is projected along a projection optical axis of the reference beam and the direction the same as that of the reference beam.

23. The holographic memory reproduction apparatus according to claim 19, wherein the servo optical system is configured such that the servo beam is projected along a projection optical axis of the reference beam and one of the direction opposite to that of the reference beam.

24. The holographic memory reproduction apparatus according to claim 19, wherein the servo optical system is configured such that the servo beam is a plane wave having a beam diameter of $1/100$ to $1/10$ of the beam diameter of one of the object beam, the reference beam, and the reproduction beam.

25. The holographic memory reproduction apparatus according to claim 19, wherein shift multiplex recording is performed two-dimensionally on the holographic recording medium, and the servo optical system is configured such that two-dimensional reproduction position servo-control is performed on the holographic recording medium by means of the diffraction beam generated by the projection of the servo beam.

26. The holographic memory reproduction apparatus according to claim 24, wherein shift multiplex recording is performed two-dimensionally on the holographic recording medium, and the servo optical system is configured such that two-dimensional reproduction position servo-control is performed on the holographic recording medium by means of the diffraction beam generated by the projection of the servo beam.

27. The holographic memory reproduction apparatus according to claim 19, wherein the servo optical system comprises a servo beam source which emits the servo beam different from the reproduction beam.

28. The holographic memory reproduction apparatus according to claim 24, wherein the servo optical system comprises a servo beam source which emits the servo beam different from the reproduction beam.

29. The holographic memory reproduction apparatus according to claim 25, wherein the servo optical system comprises a servo beam source which emits the servo beam different from the reproduction beam.

30. The holographic memory reproduction apparatus according to claim 19, wherein the servo optical system comprises a reproduction beam splitting apparatus which forms the servo beams by splitting part of the reproduction beam transmitting the recording layer.

31. The holographic memory reproduction apparatus according to claim 24, wherein the servo optical system comprises a reproduction beam splitting apparatus which forms the servo beams by splitting part of the reproduction beam transmitting the recording layer.

32. The holographic memory reproduction apparatus according to claim 25, wherein the servo optical system comprises a reproduction beam splitting apparatus which forms the servo beams by splitting part of the reproduction beam transmitting the recording layer.

33. The holographic memory reproduction apparatus according to claim 26, wherein the servo optical system comprises a reproduction beam splitting apparatus which forms the servo beams by splitting part of the reproduction beam transmitting the recording layer.

* * * * *